United States Patent [19]

Fina

[11] Patent Number: 4,458,547
[45] Date of Patent: Jul. 10, 1984

[54] NON-METALLIC SPROCKET

[75] Inventor: Paul E. Fina, Riverside, Ill.

[73] Assignee: Resinoid Engineering Corporation, Skokie, Ill.

[21] Appl. No.: 322,258

[22] Filed: Nov. 17, 1981

[51] Int. Cl.³ .......................... B32B 3/02; F16H 55/16
[52] U.S. Cl. .......................................... 74/460; 74/446;
74/DIG. 10; 264/257; 264/258; 264/262;
264/271.1; 428/65; 428/66
[58] Field of Search .................. 428/65, 66, 182, 184,
428/284; 74/446, 460, DIG. 10; 29/159.2;
264/257, 258, 262, 271.1

[56] References Cited

U.S. PATENT DOCUMENTS

| 266,708 | 10/1882 | Martindale . | |
|---|---|---|---|
| 1,501,026 | 7/1924 | Guay . | |
| 1,504,596 | 8/1924 | Bastian . | |
| 1,622,116 | 3/1927 | Jaspert . | |
| 1,638,255 | 8/1927 | Gammeter . | |
| 1,850,684 | 3/1932 | Nathan | 428/65 |
| 1,912,083 | 5/1933 | Lytle . | |
| 2,000,769 | 5/1935 | Mansur . | |
| 2,064,723 | 12/1936 | Benge | 428/66 |
| 2,229,982 | 1/1941 | Mansur et al. . | |
| 2,722,130 | 11/1955 | Caldwell . | |
| 2,724,671 | 11/1955 | Lombardy . | |
| 3,026,228 | 3/1962 | Robinson et al. . | |
| 3,915,783 | 10/1975 | Goppel et al. . | |
| 3,999,445 | 12/1976 | Liautaud | 29/159.2 |
| 4,207,778 | 6/1980 | Hatch | 428/113 |

Primary Examiner—Paul J. Thibodeau
Attorney, Agent, or Firm—Wood, Dalton, Phillips, Mason & Rowe

[57] ABSTRACT

An improved non-metallic sprocket, such as the phenolic laminate type, one improvement consisting of sprocket teeth molded from continuous layers of material laminated in a corrugated, sprocket tooth forming construction about the periphery of the sprocket. Another improvement consists of the inclusion of a non-metallic hub fashioned from a length of resin pre-impregnated material, in particular, fiberglass cloth, wound into a tube. During the molding of the sprocket the layers of material forming the tube are laminated into a solid hub.

9 Claims, 4 Drawing Figures

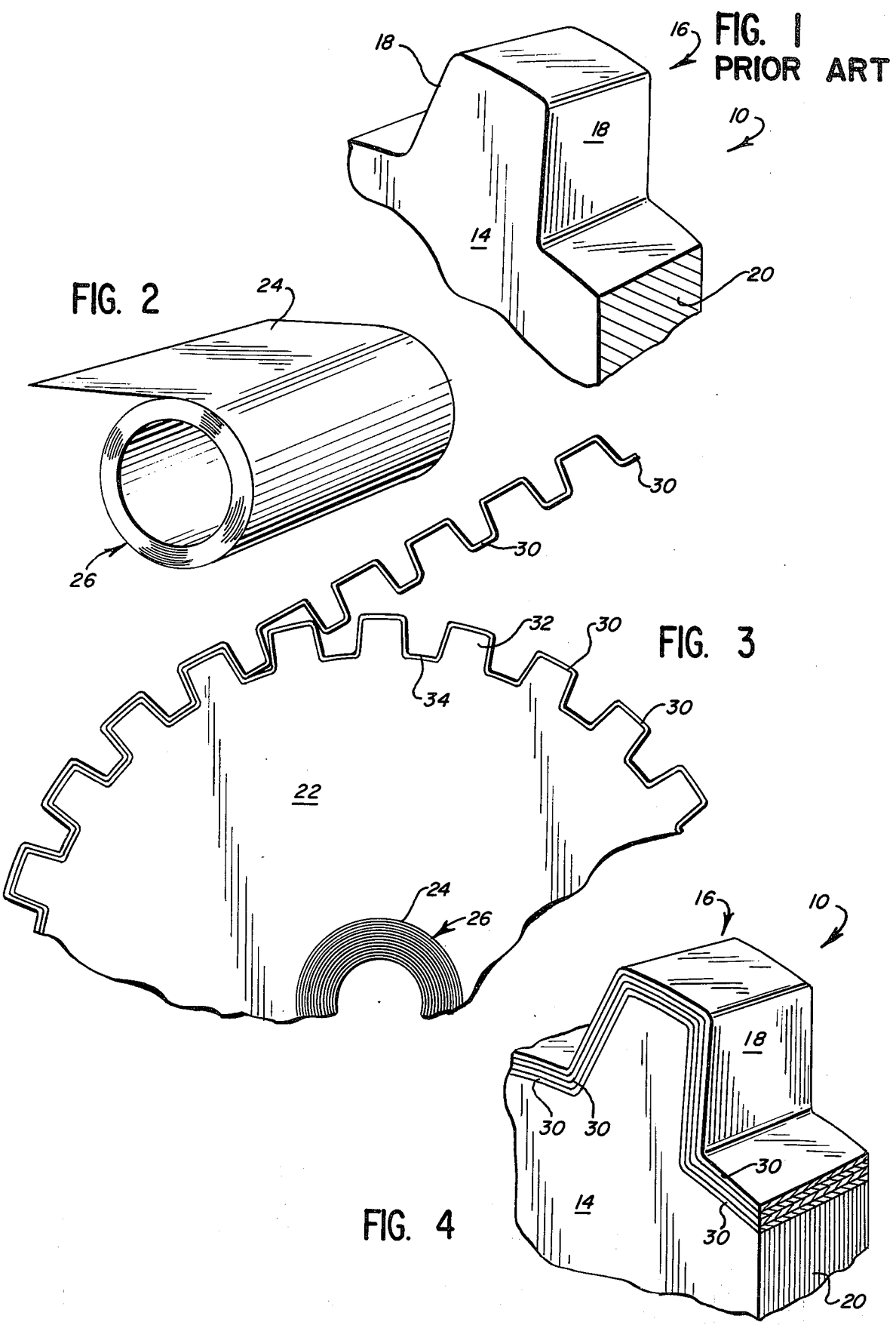

NON-METALLIC SPROCKET

BACKGROUND OF THE INVENTION

Non-metallic sprockets and gears have gained wide acceptance in the industry due to the fact that, relative to their metal counterparts, sprockets of the non-metallic type are inexpensive, lightweight and tend to be of silent operation. One exemplary use is as a sprocket to drive a timing belt for internal combustion engines. The non-metallic sprockets do not wear the rubberized or synthetic timing belt as much as with a comparable metal sprocket.

Various techniques are known in the prior art for manufacturing the aforementioned non-metallic sprockets. One method, described in the Guay U.S. Pat. No. 1,501,026 issued July 8, 1924 consists of laminating layers of circular or annular material in the axial direction. The laminations, pre-impregnated with, for example, phenolic resin are then pressed and heated in a mold causing the resin to melt and subsequently cure (i.e., harden) resulting in a sprocket of desired characteristics.

Another method heretofore used for creating a non-metallic sprocket is the mixture of bits of fabric material or the like with a binder, such as for example, phenolic resin, to form a molding compound. This molding compound is thereafter permitted to dry in for example a cylindrical or tablet shape, for later use in the molding process. The resin pre-impregnated molding compound is thereafter placed in a mold with for example a metallic hub whereupon the mold compound is pressed and heated melting the resin and causing the molding compound to properly fill the mold. After the molding compound has cured the mold is opened yielding a non-metallic sprocket consisting of a mixture of fabric and hardened resin surrounding the hub.

To form the requisite teeth in sprockets formed by either of the above methods the mold may have a circumferential tooth imaging die which is filled by the laminates or the molding compound during the molding of the sprocket. Alternately teeth may be hobbed from a molded cylindrical sprocket blank.

It has been found that the teeth of sprockets formed by either of the above methods do not possess the wear characteristics required by many modern applications. For example, in sprockets used to drive timing belts for an automobile, it has been found that advances in the construction of the timing belt resulting in its longer life has, in turn, created additional wear upon the teeth of the sprocket resulting in their premature failure.

It has further been found that the inclusion of a metallic hub substantially increases the overall cost of the sprocket. Substitutes for metallic hubs heretofore used have not proven successful due to the high torques which the hub must withstand in many modern applications.

Therefore, it is an object of the present invention, to set forth a sprocket which overcomes the problems noted above.

SUMMARY OF THE INVENTION

Accordingly it is an object of this invention to set forth a construction for a non-metallic sprocket or gear wherein the teeth possess superior wear characteristics and whose non-metallic hub reduces the overall cost of the sprocket and yet has the strength and durability required for many modern applications.

Toward this end a non-metallic sprocket or gear is set forth wherein the teeth are formed during the molding process from continuous layers of binder pre-impregnated material, in particular fiberglass cloth, laminated into a corrugated, tooth forming pattern. By this construction the faces of the teeth present a continuous surface of durable material thereby providing for stronger, more durable teeth.

In another aspect of the present invention an improved non-metallic sprocket is set forth whose non-metallic hub consists of layers of material, in particular fiberglass cloth, impregnated with a binder and wound in a spiral fashion so as to form a tube. During the molding of the sprocket the binder, which may be phenolic resin, melts and thereafter cures or solidifies to laminate the layers of material to one another and to the remainder of the sprocket thereby forming a strong and durable non-metallic hub.

DETAILED DESCRIPTION OF THE DRAWINGS

FIG. 1 is a perspective view of a portion of a gear or sprocket constructed by known means;

FIG. 2 is a perspective view of the hub of this invention illustrating its formation;

FIG. 3 is a side view of the gear or sprocket illustrating the corrugated tooth form;

FIG. 4 illustrates a perspective view of a portion of a non-ferrous gear or sprocket incorporating the teeth of this invention.

DESCRIPTION

Turning to FIG. 1 a portion of a sprocket 10 constructed by known methods is shown. The sprocket 10 consists of a hub (not shown in FIG. 1), a web 14 and a plurality of peripheral teeth 16. Each of the teeth 16 has opposing teeth faces 18 which, during operation of the sprocket 10 receive or transmit rotative forces and concomitant therewith, frictional wear. While the hub is usually metallic, the web 14 and teeth 16 consist of a molding compound shown generally at 20 which is an admixture of bits of fabric and a binder such as, for example, phenolic resin.

To construct the sprocket 10 of FIG. 1, the molding compound 20 is premixed and thereafter allowed to harden in, for example, a cylindrical tablet 22 (not shown in FIG. 1). This tablet 22 is introduced into a mold having a circumferential toothed die. Closing the mold and subjecting the tablet 22 to pressure and heat, causes the resin to melt and, along with the fabric 18, completely fill the mold and its toothed die. Permitting the molding compound 20 to cure yields, upon opening of the mold, a solid sprocket 10 having teeth 16 as illustrated in FIG. 1.

In many modern applications it has been found that the teeth 16 of sprockets 10 constructed of only molding compound 20, as described above, do not possess satisfactory wear properties. For example, in one such application the sprocket 10 is used to drive a toothed belt. Often, to increase the operating life of the belt, reinforcement of the belt and particularly its teeth is provided. However, the reinforcement used for the belt teeth, causes increased wear upon the sprocket teeth 16 and more particularly their faces 18 resulting in premature failure of the teeth 16. It has also been found that the metallic hub is a major factor in the overall cost of the sprocket 10.

Turning to FIGS. 2-3 the non-metallic hub of this invention is shown. To construct the hub of this invention material 24 is wound in a spiral fashion to form a hub insert 26. While progressively larger diameter tubes superposed over one another, or the use of short strips of material 24 may be used, the winding of a long strip of material 24 having a width comparable to the axial length of the desired finished hub is preferable.

The material 24 may be fabric material, however, for strength and durability, fiberglass cloth is particularly advantageous. Prior to forming the insert 26, the material 24 is pre-impregnated with a binder, such as phenolic resin, which has been permitted to solidify rendering the material 24 somewhat stiff.

When a suitable amount of material 24 is wound to form an insert 26 of desired dimensions, the insert, as shown in FIG. 3 is placed in a mold (not shown). The desired dimensions are dependent upon requirements of the finished hub. Specifically these requirements include axial length, strength and shaft diameter. Strength is dependent upon the material 24 used and therefore the use of fiberglass cloth is particularly advantageous due to its strength and durability characteristics.

Turning to FIGS. 3 and 4 the other aspect of this invention, which substantially increases the resistance of the sprocket teeth to wear, is shown.

To fashion the improved sprocket teeth 16 of this invention the insert 26 is positioned at the center of the sprocket mold (not shown) which has, as described above, an outer toothed die. Placed about the insert 26, is the tablet 22 of molding compound 20 which will, when the sprocket 10 is molded, represent the web 14 thereof. Wrapped about the periphery of the tablet 22 is a form 30. The form 30 may be of any suitable durable fabric material, however, fiberglass cloth has been found to be particularly advantageous due to its strength and durability. The fiberglass cloth, pre-impregnated with a binder such as phenolic resin, is preformed into the somewhat stiff, corrugated form 30 having alternating spaces 32 and lands 34. While the corrugated form 30 is preferable for reasons which will hereinafter become evident, other shapes such as a wave pattern or the like may also be used.

As seen in FIG. 3, the form 30 is wrapped several times about the tablet 22 such that layer upon layer of corrugations are superposed upon one another. Additional layers of fiberglass cloth may be applied in a similar manner depending upon the desired strength and durability of the teeth 16 and finished cost of the sprocket 10. It is also of note that the corrugations of the form 30 should be of dimensions to be received into the mold's toothed die.

Closing the mold and subjecting its contents to heat and pressure causes the phenolic resin in the spirally wrapped insert 26, the tablet 22 and in the form 30 to melt and forces the molding compound 20 of the tablet 22 outward against the form 30. In so doing the layers of form 30 closely mate with the mold die and with one another and the molding compound 20 fills the form spaces 32. The extra material provided by the corrugations in the form 30 enables the superposed layers to follow the tooth contour of the die without tearing or grossly deforming.

When the resin has cured and the mold is opened, a non-metallic sprocket 10 is obtained having teeth 16 one of which is shown in FIG. 4. The layers of strong, durable fiberglass cloth of the form 30 have been bound, or laminated, to form the outer surfaces of the teeth 16 and more particularly the wear experiencing tooth faces 18. In addition to the laminating of the layers of the form 30 to one another, the form 30 is bound about the periphery of the web 14 due to the filling of the form spaces 28 by the molding compound 20 and the general binding action of the resin. Concomitant to the molding of the teeth 16, the layers of material 24 used in forming the insert 26 have been laminated to one another to form a solid, strong and durable hub. The hub, as with the form 30, due to the binding action of the resin is firmly secured to the web 14 forming thereby a complete sprocket 10.

I claim:

1. In a non-metallic sprocket of the type having a hub and a molded web the periphery of which has contour defining teeth having faces to receive or transmit forces to or from said sprocket, the improvement comprising:
    at least one layer of fabric material molded to and following the contour of said teeth, said material extending across and covering the faces of said teeth to resist wear.

2. The sprocket described in claim 1 wherein said material is fiberglass cloth.

3. In a non-metallic sprocket of the type having a hub and a web molded about said hub, said web having a periphery profiled to define teeth having axially extending faces, the improvement comprising:
    a corrugated form of fabric material secured about the periphery of the web conforming to said tooth profile, said form extending axially across and forming the faces of said teeth during the molding thereof.

4. The sprocket described in claim 3 wherein said form is superposed layers of fabric material.

5. The sprocket described in claim 4 wherein at least one of said layers is fiberglass cloth.

6. An improved molded, non-metallic sprocket of the type having a hub and a web, the periphery of which is contoured to define teeth having faces, the improvement comprising:
    said hub has a plurality of tubular-shaped layers of fabric material superposed and molded together to form said hub during the molding of said sprocket; and
    at least one layer of fabric material molded to and following the contour of said teeth, said material extending across and covering the faces of said teeth to resist wear.

7. The improved sprocket as described in claim 6 wherein said hub consists of a length of fiberglass cloth spirally wound into said tubular shape and molded together to form said hub.

8. The improved sprocket as described in claim 6 wherein said fabric material following the contour of said teeth is fiberglass cloth.

9. In a method for molding a non-metallic sprocket in a cylindrical mold having tooth contour-forming wall, said method including positioning a hub in the center of the mold, disposing a tablet of web-forming non-metallic material about said hub, the improvement comprising:
    wrapping at least one layer of a corrugated fabric material about the periphery of said tablet; and
    molding said sprocket, said tablet and fabric material received into and assuming the contour of said wall to form teeth, said fabric material following the outer surfaces and extending across the faces of said teeth to resist wear.

* * * * *